Patented Aug. 10, 1937

2,089,322

UNITED STATES PATENT OFFICE 2,089,322

METHINE CYANINE DYE

Walter Zeh, Dessau in Anhalt, Germany, assignor to Agfa Ansco Corporation, Binghamton, N. Y., a corporation of New York No Drawing. Application May 27, 1933, Serial No. 673,324. In Germany June 7, 1932

5 Claims. (Cl. 260—44)

My present invention relates to sensitizing of silver halide emulsions.

One of its objects is to provide such an emulsion the sensitiveness of which is raised over the range of wave lengths to which the emulsion is normally sensitive or the sensitiveness of which is increased in the region of the initial sensitiveness of the silver halide emulsion. Another object is the dyes incorporated in such an emulsion in order to increase its sensitivity. Further objects will be seen from the detailed specification following hereafter.

In my co-pending application Serial No. 590,772, I have described the use of benzselenazole-methine-cyanines and benzselenazole-methine-cyanines substituted in the benzine nucleus by alkyl, alkoxy or benzene for sensitizing silver halide emulsion and particularly silver chloride emulsions.

According to this invention I have found that also the benzselenazole-methine-cyanines containing in the benzene nucleus an amino group or a substituted amino group and corresponding with the general formula

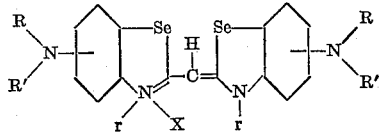

R=H, alkyl,
R'=H, alkyl, acyl,
r=alkyl
X=halide, perchlorate, paratoluene sulfonate, alkylo sulfate, nitrate or another suitable anion are also efficient for improving the sensitivity of a silver halide emulsion for the blue rays of the spectrum. The range of sensitivity of an emulsion comprising a short region of initial sensitivity will be increased, or if the region of initial sensitivity will not be increased by the addition of the sensitizer its sensitivity within the range of initial sensitiveness will be increased. The sensitizers are therefore well suited for sensitizing silver chloride emulsion which may be used in color photography.

The range of sensitization of the new sensitizers extends from a wave length of about 430$\mu\mu$ to about 520$\mu\mu$.

The dyes are obtainable according to the desired solubility in form of the bromide, iodide, perchlorate etc., and are used in a quantity as usual for the known sensitizing dyes. This quantity amounts to about 15 to 30 milligrams per 1 kg. of emulsion ready for being cast which contains about 9 per cent of gelatin, 4.5 per cent of silver-halide, the rest being water. However, I do not wish to limit my invention to the quantities just indicated, the most suitable amount will in each case be found by a few comparative experiments. The dyes may be added to the emulsion in form of solutions. Suitable solvents are the alcohols, for instance, methyl or ethyl alcohol which may be used anhydrous or diluted with water. The dyes are applied to the emulsion during any stage of its production, however, they are preferably added to the finished emulsion before being cast. The dyes may likewise be added by bathing the finished photographic material in a bath in which the dye is dissolved. The dyes are suited for sensitizing an emulsion made according to the boiling process as well as for sensitizing an emulsion made according to the ammonia process.

The following examples serve to illustrate my invention:

*Example 1.*—The dye bis-[3-methyl-6-acetyl-amino-benzselenazole-(2)]-methine-cyanine iodide corresponding with the formula

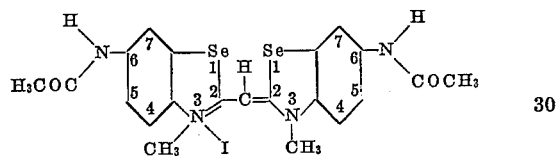

may be obtained by heating 2 grams of 2-methyl-6-acetylamino-benzselenazole methiodide in 10 cc. of acetic anhydride until boiling and adding 1 cc. of amylnitrite. While frothing the mixture takes a brownish yellow color and the dye separates after cooling.

The alcoholic solution of the dye has an absorption maximum at a wave length of about 440$\mu\mu$. A silver chloride emulsion sensitized with the dye has a maximum of sensitiveness at a wave length of about 468$\mu\mu$.

*Example 2.*—The dye bis-[3-methyl-6-propionylamino-benzselenazole-(2)]-methine-cyanine iodide corresponding with the formula

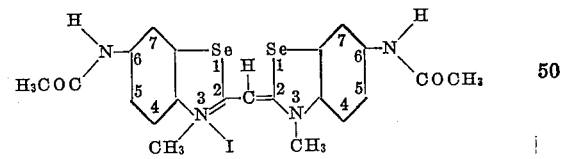

may be obtained by heating 2 grams of 2-methyl-6-propionyl-amino-benzselenazole methiodide in 10 cc. of acetic anhydride until boiling and adding 1 cc. of ethylnitrite. While frothing the mixture takes a brownish yellow color and the dye separates after cooling.

The alcoholic solution of the dye has an absorption maximum at a wave length of about 440μμ.

A silver chloride emulsion sensitized with the dye has a maximum of sensitiveness at a wave length of about 470μμ.

*Example 3.*—The dye bis-[3-methyl-5-acetyl-amino-benzselenazole-(2)]-methine-cyanine iodide corresponding with the formula

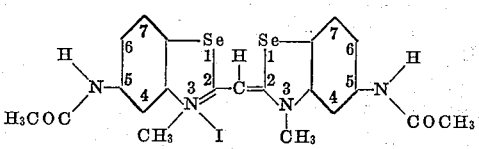

may be obtained by heating 2-methyl-5-acetyl-amino-benzselenazole methiodide in 10 cc. of acetic anhydride after the addition of 1.5 cc. of amylnitrite mixed with 3 cc. of acetic anhydride and continuing with boiling for about 3 minutes. After cooling the dye separates in form of yellow flakes.

The alcoholic solution of the dye has an absorption maximum at a wave length of about 468μμ.

A silver chloride emulsion sensitized with the dye has a maximum of sensitiveness at a wave length of about 468μμ.

In the appended claims the expression "alkacylamino" means an amino group substituted by an aliphatic acyl radical.

It is to be understood that my invention is not limited to the foregoing examples nor to the specific details given therein. Numerous other embodiments are possible and I contemplate as included within my invention all such modifications and equivalents as fall within the scope of the appended claims. So, for instance, the benzene nuclei may contain besides the amino group or substituted amino group one or more substituents. The nomenclature used is arbitrary, but it is familiar to every chemist skilled in the art.

What I claim is:

1. A bis-[3-alkyl-benzselenazole-(2)]-methine-cyanine salt containing in its benzene nuclei a substituent of the group consisting of amino and alkacyl amino.

2. A bis-[3-alkyl-benzselenazole-(2)]methine-cyanine salt containing in its benzene nuclei an acylamino group of a lower fatty acid.

3. Bis-[3-methyl-6-acetylamino-benzselenzole-(2)]-methine-cyanine iodide.

4. Bis-[3-methyl-6-propionylamino-benzselenazole-(2)]-methine-cyanine iodide.

5. Bis-[3-methyl-5-acetylamino-benzselenazole-(2)]-methine-cyanine iodide.

WALTER ZEH.